US012559242B2

(12) United States Patent

Junior et al.

(10) Patent No.: US 12,559,242 B2

(45) Date of Patent: Feb. 24, 2026

(54) AUTONOMOUS UNIT FOR EMERGENCY LIGHTING SYSTEM FOR AIRCRAFT, eVTOLs, VTOLs AND ROTORCRAFT

(71) Applicant: EMBRAER S.A., São José dos Campos—SP (BR)

(72) Inventors: Fernando Alves Augusto Junior, São José dos Campos—SP (BR); Jesus Bravo de Sousa Da Fonseca, São José dos Campos—SP (BR); Eudes Rafael Cardoso Malemene, São José dos Campos—SP (BR); Carlos Guilherme Dal Corso, São José dos Campos—SP (BR); Ricardo Rosa Macêdo, São José dos Campos—SP (BR); Luiza Peres Ribas, São José dos Campos—SP (BR); Laryssa Lorrany Olinda Costa, São José dos Campos—SP (BR)

(73) Assignee: EMBRAER S.A., São José dos Campos (BR)

( * ) Notice: Subject to any disclaimer, the term of this patent is extended or adjusted under 35 U.S.C. 154(b) by 0 days.

(21) Appl. No.: 18/586,230

(22) Filed: Feb. 23, 2024

(65) Prior Publication Data

US 2024/0308672 A1 Sep. 19, 2024

Related U.S. Application Data

(60) Provisional application No. 63/452,790, filed on Mar. 17, 2023.

(51) Int. Cl.
B64D 11/00 (2006.01)
B64D 25/00 (2006.01)
(Continued)

(52) U.S. Cl.
CPC ............. B64D 25/00 (2013.01); B64D 47/02 (2013.01); F21S 9/022 (2013.01);
(Continued)

(58) Field of Classification Search
CPC .................... B64D 25/00; B64D 47/02; B64D 2011/0038; B64D 2203/00;
(Continued)

(56) References Cited

U.S. PATENT DOCUMENTS

| | | | |
|---|---|---|---|
| 7,378,989 B2 | 5/2008 | Wisch et al. | |
| 9,386,638 B2 | 7/2016 | Trinschek et al. | |

(Continued)

FOREIGN PATENT DOCUMENTS

| | | | |
|---|---|---|---|
| CN | 114123452 | * | 3/2022 |
| CN | 114123452 | A | 3/2022 |
| IT | UB20154880 A1 | | 4/2017 |

OTHER PUBLICATIONS

Bueno, "Nanoscale origins of super-capacitance phenomena". Journal of Power Sources. 414: 420-434. (Feb. 28, 2019, doi.org/10.1016/j.jpowsour.2019.01.010; IEC 62391-2.

(Continued)

*Primary Examiner* — Daniel Cavallari
*Assistant Examiner* — Xuan Ly
(74) *Attorney, Agent, or Firm* — Nixon & Vanderhye P.C.

(57) ABSTRACT

A light unit executes up to three different functions (cabin area illumination, individual/dedicated/decorative illumination and emergency illumination) and an emergency illuminated sign unit, each one with an internal controller and a rechargeable capacitor. An example non-limiting embodiment also provides a cabin light system and an emergency lighting system, where each illumination unit (light source or illuminated sign) is as described above.

13 Claims, 8 Drawing Sheets

Detailed block diagram of the Emergency Lighting Unit

(51) Int. Cl.

| | |
|---|---|
| *B64D 47/02* | (2006.01) |
| *F21S 9/02* | (2006.01) |
| *F21W 106/00* | (2018.01) |
| *F21W 107/30* | (2018.01) |
| *F21Y 115/10* | (2016.01) |
| *H02J 7/00* | (2006.01) |
| *H02J 7/34* | (2006.01) |
| *H02J 9/06* | (2006.01) |
| *H05B 45/00* | (2022.01) |
| *H05B 47/105* | (2020.01) |
| *H05B 47/17* | (2020.01) |

(52) U.S. Cl.

CPC .......... *H02J 7/00309* (2020.01); *H02J 7/345* (2013.01); *H02J 9/061* (2013.01); *H05B 45/00* (2020.01); *H05B 47/105* (2020.01); *H05B 47/172* (2024.01); *B64D 2011/0038* (2013.01); *B64D 2203/00* (2013.01); *F21W 2106/00* (2018.01); *F21W 2107/30* (2018.01); *F21Y 2115/10* (2016.08); *H02J 2207/50* (2020.01)

(58) Field of Classification Search

CPC .......... B64D 2045/007; B64D 2221/00; B64D 11/00; F21S 9/022; F21S 9/02; H02J 7/00309; H02J 7/345; H02J 9/061; H02J 2207/50; H02J 9/065; H02J 7/007182; H02J 7/007194; H02J 2310/44; H02J 7/00; H02J 7/34; H02J 9/06; H05B 45/00; H05B 47/105; H05B 47/172; H05B 47/17; F21W 2106/00; F21W 2107/30; F21W 106/00; F21W 107/30; F21Y 2115/10; F21Y 115/10; B60Q 3/46

USPC .......................................................... 307/9.1

See application file for complete search history.

(56) References Cited

U.S. PATENT DOCUMENTS

| | | | | |
|---|---|---|---|---|
| 9,655,186 | B2 | 5/2017 | Hessling et al. | |
| 2006/0146553 | A1 | 7/2006 | Zeng et al. | |
| 2012/0176808 | A1* | 7/2012 | Rust ........................ | H02J 9/065 |
| | | | | 362/470 |
| 2014/0266125 | A1* | 9/2014 | Athalye ............. | H05B 45/3725 |
| | | | | 323/299 |
| 2017/0088286 | A1* | 3/2017 | Oltheten .............. | G02B 5/0284 |
| 2018/0186470 | A1* | 7/2018 | Olthten .................. | G09F 13/22 |

OTHER PUBLICATIONS

G. L. Bullard et al, "Operating principles of the ultracapacitor," IEEE Transactions on Magnetics, vol. 25, No. 1, pp. 102-106 (Jan. 1989), doi: 10.1109/20.22515.

Calle et al., Graphene-Based Ultra-Light Batteries for Aircraft, NASA Aeronautics Mission Directorate 2014 Seedling Technical Seminar, Cocoa Beach, FL (Feb. 19, 2014).

Maxwell Technologies, 3.0V 3400F Ultracapacitor Cell Datasheet BCAP3400 P300 K04/05, 2021.

Extended European Search Report issued in EP Application No. 24163119.1 dated Jul. 1, 2024.

* cited by examiner

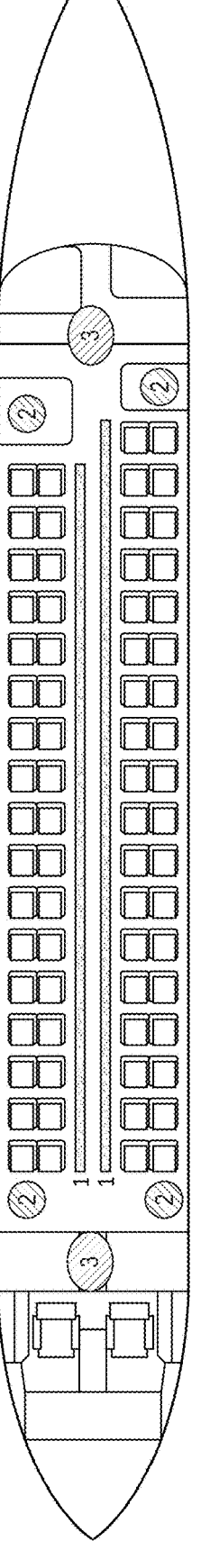
FIG. 1 – Emergency light system example

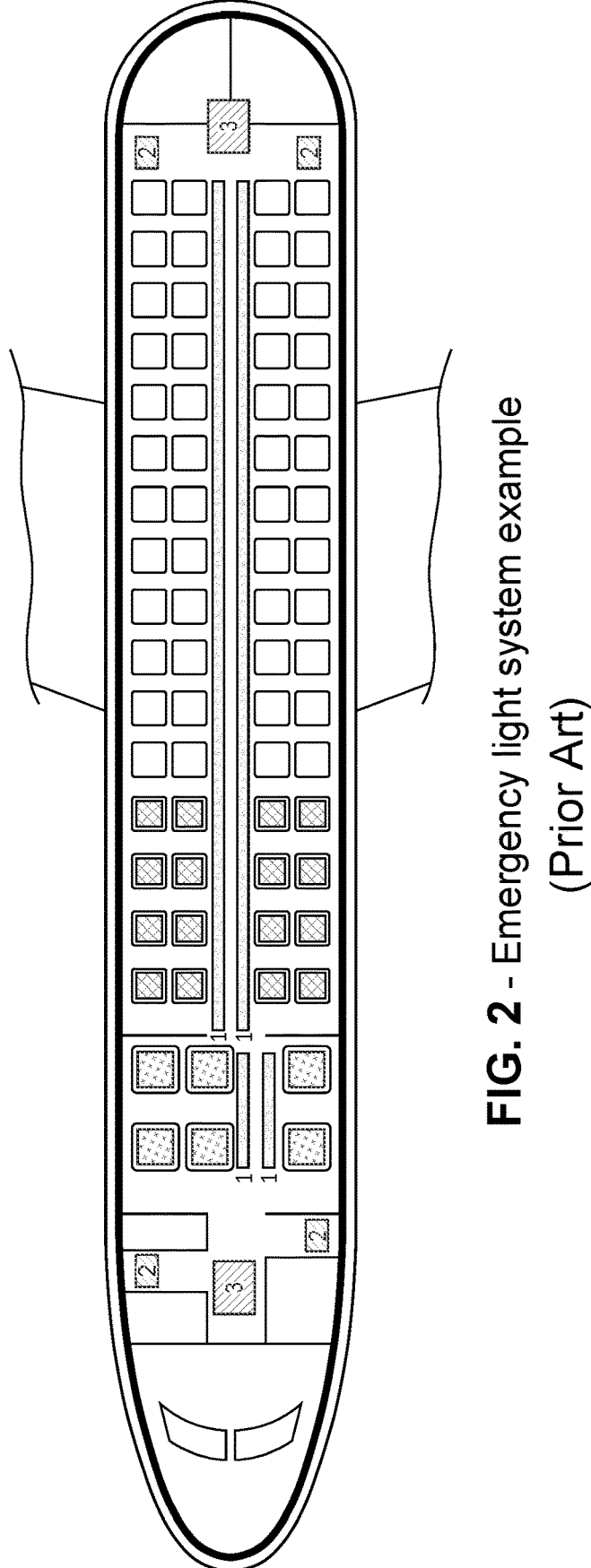
FIG. 2 - Emergency light system example
(Prior Art)

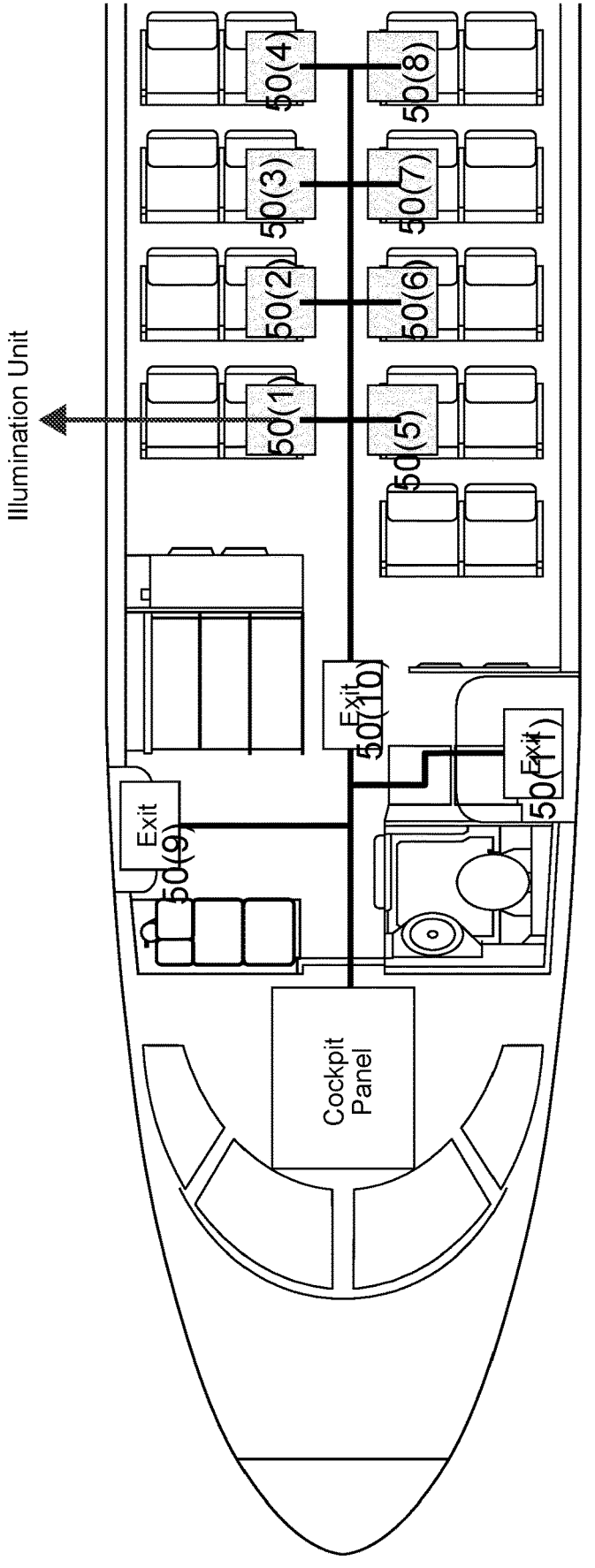
FIG. 3 – Illustrative example of the system in an airplane

Figure 4:
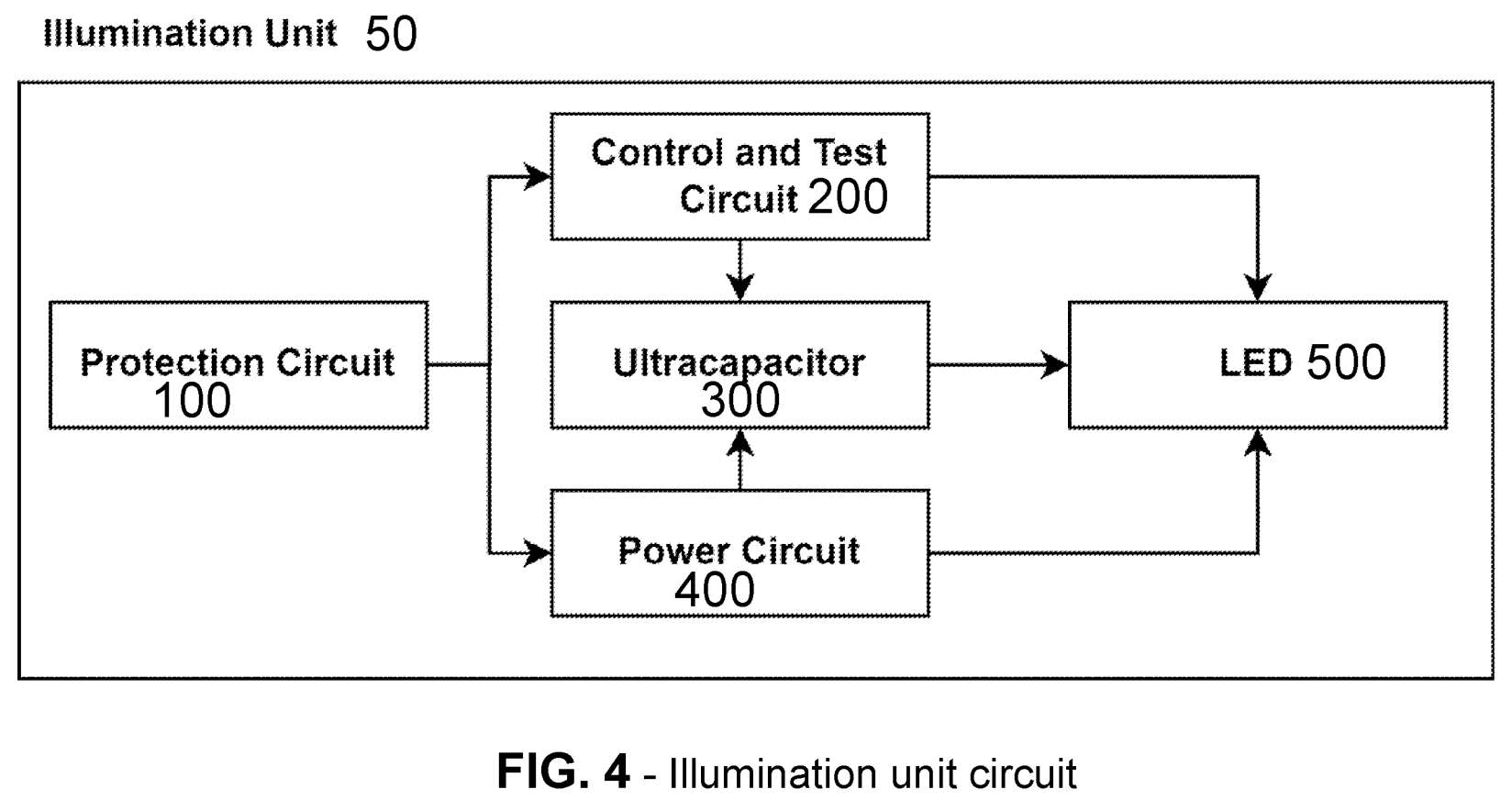

Illumination Unit 50

Control and Test Circuit 200

Ultracapacitor 300

Power Circuit 400

LED 500

Protection Circuit 100

FIG. 4 – Illumination unit circuit

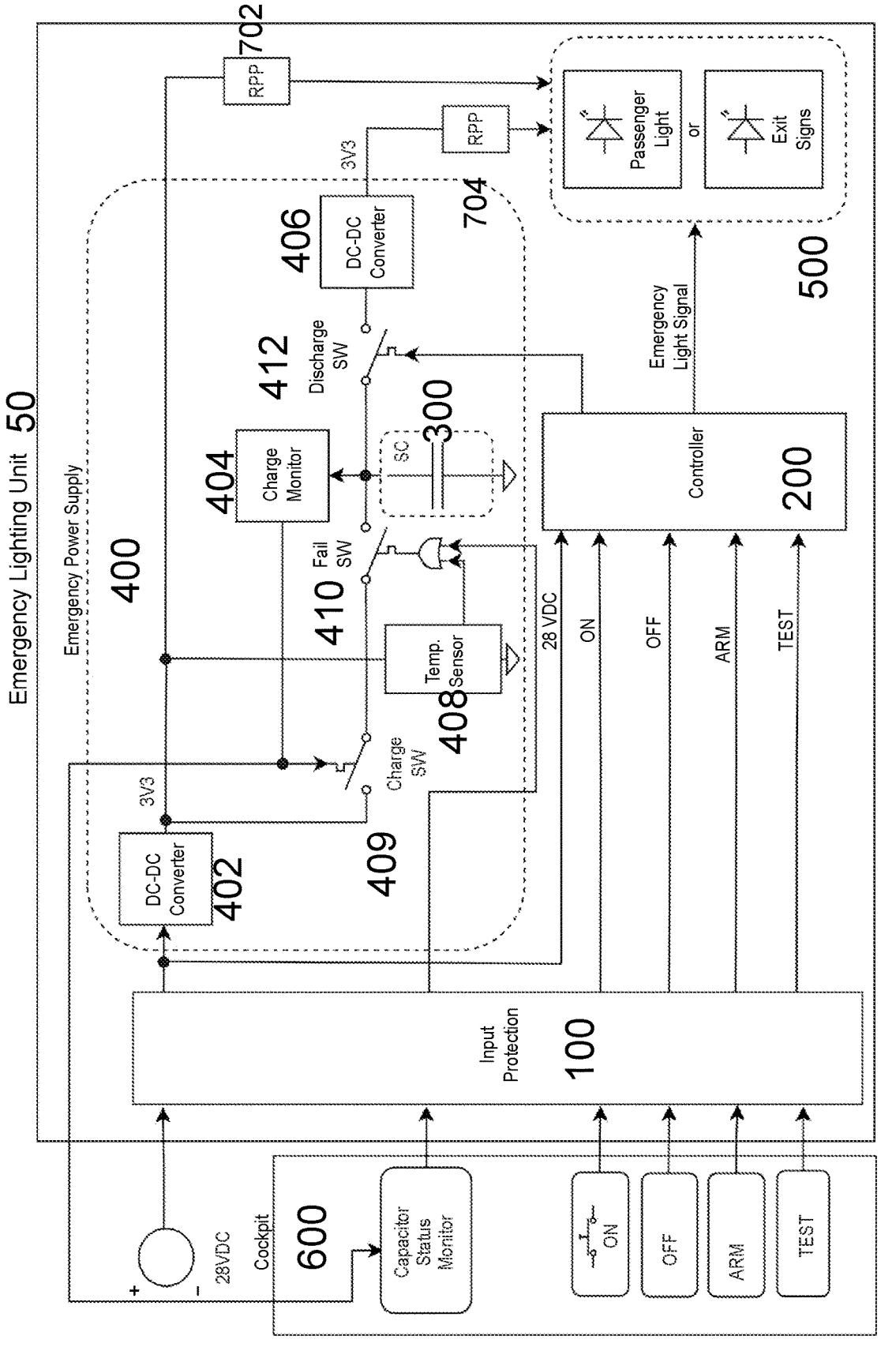
FIG. 5 - Detailed block diagram of the Emergency Lighting Unit

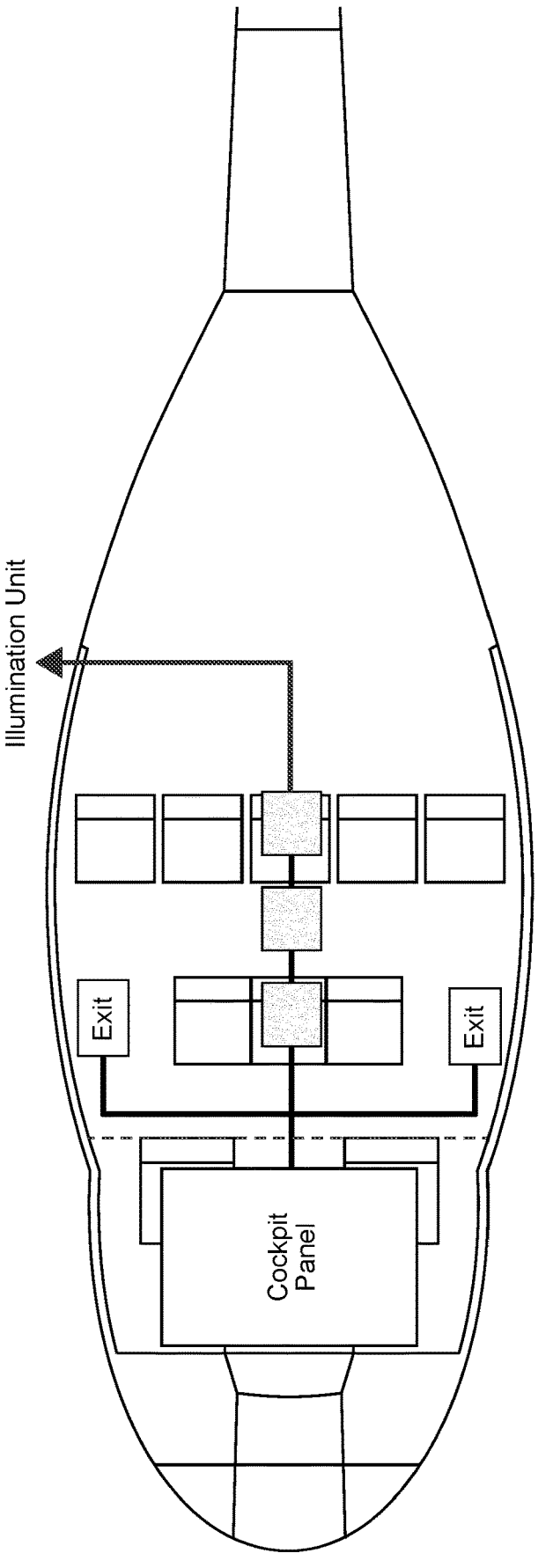
FIG. 6 - Example of application of the system in rotorcraft

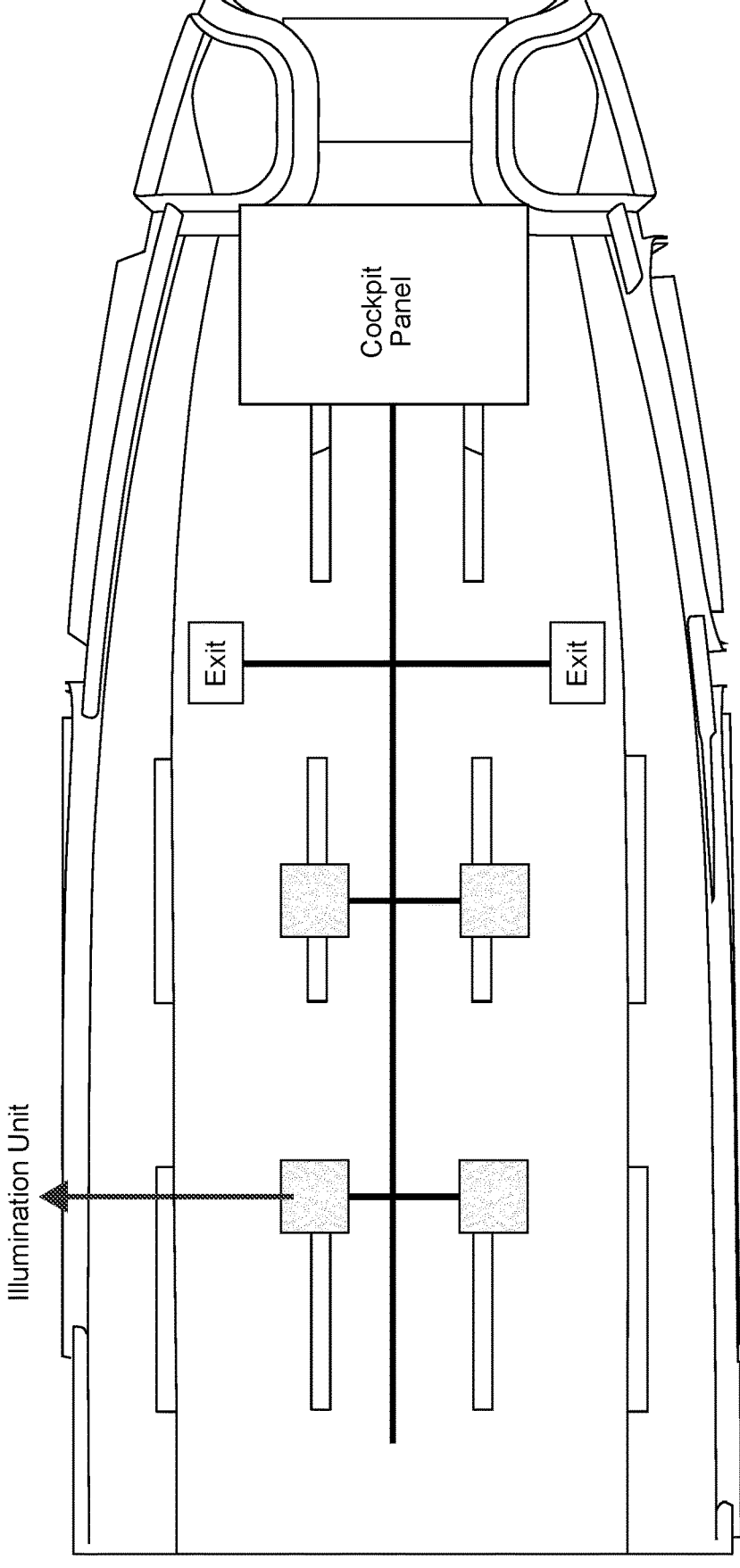
FIG. 7 - Example of an application of the system in eVTOLS

Logic State Diagram (ON=1) OR (TEST=1) OR ((ARM=1) AND (28VDC=0))

OFF=1

Operative

Inoperative

AUTONOMOUS UNIT FOR EMERGENCY LIGHTING SYSTEM FOR AIRCRAFT, eVTOLs, VTOLs AND ROTORCRAFT

CROSS-REFERENCE TO RELATED APPLICATIONS

Benefit is claimed to U.S. Provisional Patent Application No. 63/452,790 filed Mar. 17, 2023, which is incorporated herein by reference in its entirety and for all purposes.

FIELD

This technology relates to passenger aircraft lighting systems, and applies to passenger cabin emergency lights, cockpit emergency lights and illuminated signs such as exit signs of aircraft, eVTOLs, VTOLs and rotorcraft.

BACKGROUND & SUMMARY

Every aircraft needs to be able to illuminate its interior even in emergency situations. The authorities (ANAC/FAA/ EASA) require that every aircraft has "an emergency lighting system independent of the main cabin lighting system". See 14 CFR § 25.812. The emergency lighting system must be on and providing a minimum average illumination level inside the cabin for at least 10 minutes, giving time for the passengers to evacuate the airplane, VTOLs, eVTOLs or rotorcraft.

The emergency lighting system usually includes emergency lights, illuminated signs and batteries that guarantee the operation of the lights in case of emergency. In the event of "any single transverse vertical separation of the fuselage during crash landing," at least 75% of the lights must remain operational" (exclusive of lights actually damaged by a crash landing). Id. This requirement commonly leads to each emergency lighting system unit being powered at least by two batteries—one located in the forward part of the aircraft and other in the aft part of the airplane.

FIG. 1 and FIG. 2 shown examples of emergency lighting system, where the columns (1) running down the center represent the lights, the items (2) are the exit signs, and the items (3) are the fore and aft batteries.

These systems use batteries 3 as an independent power source in order to guarantee that the system will always provide the necessary illumination in case of emergency. A periodic battery replacement is necessary as the batteries degrade in performance during time. This periodic maintenance increases the aircraft operational cost and affects the environment with the need to dispose of old batteries. Due to these maintenance activities, some access points are needed for these procedures, which increases the weight of the airplane.

As the system harnesses go all over the fuselage, the weight of the wiring also needs to be accounted for. Large gauge cables distributing high current to many points can add considerable weight and expense. Also, considering the size of the system, its certification analysis needs to be conservative which demands more engineering work hours.

The prior art shows the need of the aeronautical industry for more technological solutions in terms of emergency lighting, especially in view of the trend of industry solutions related to reduction of weight, power consumption and other evolutions.

In parallel, advances in electronic components industry have developed high power capacitors in small form factors.

One prior art solution provides an emergency lighting arrangement, with plural emergency current sources being at least one capacitor, each unit containing a control unit, a capacitor and an emergency light emitting diode (LED) light. This system contains at least one LED for emergency operation and at least one LED for normal operation. There is a disconnection circuit, and the capacitor is connected to the current source.

Another prior art solution provides an airplane emergency evacuation lamp circuit based on a supercapacitor, comprising a protection circuit, a step-down circuit, a charging circuit, a super capacitor, a booster circuit, and a light source circuit. There is a charging instruction circuit, a booster circuit unit, and a switch control.

A further prior art solution provides an autonomous emergency light unit powered by an external power supply or a rechargeable power source, at least one LED, and a control logic for a plurality of states. The system uses power modulation in order to control illumination. When there is an emergency, due to severe variations of power during power up and power down, the current will be used to verify if there is an emergency situation.

Yet another prior art solution provides an emergency lighting system including an emergency light control unit with an external power input, at least one external control input, and a plurality of light units with at least one LED and a rechargeable capacitor. The control is separated from the illumination units and there is a power line connecting the only control unit to a plurality of illumination units.

BRIEF DESCRIPTION OF THE DRAWINGS

FIG. 1 illustrates an example emergency light system in the prior art.

FIG. 2 illustrates another example emergency light system in the prior art.

FIG. 3 represents an example non-limiting embodiment of an emergency lighting system in an airplane.

FIG. 4 illustrates a high level block diagram of an example embodiment of an illumination unit.

FIG. 5 illustrates a detailed block diagram of an example embodiment of a lighting unit.

FIG. 6 illustrates an application of the system in a rotorcraft. In this embodiment, the pilot will control the state of the system in the cockpit panel, and the illumination unit is responsible for the cabin illumination according to the information of the cockpit and the situation of the rotorcraft.

FIG. 7 illustrates a application of the system in eVTOLs or VTOLs. Where the emergency light system is controlled in the cockpit panel by the pilot, the illumination unit will be also responsible for the cabin illumination.

DETAILED DESCRIPTION OF NON-LIMITING EMBODIMENTS

Figure 8:
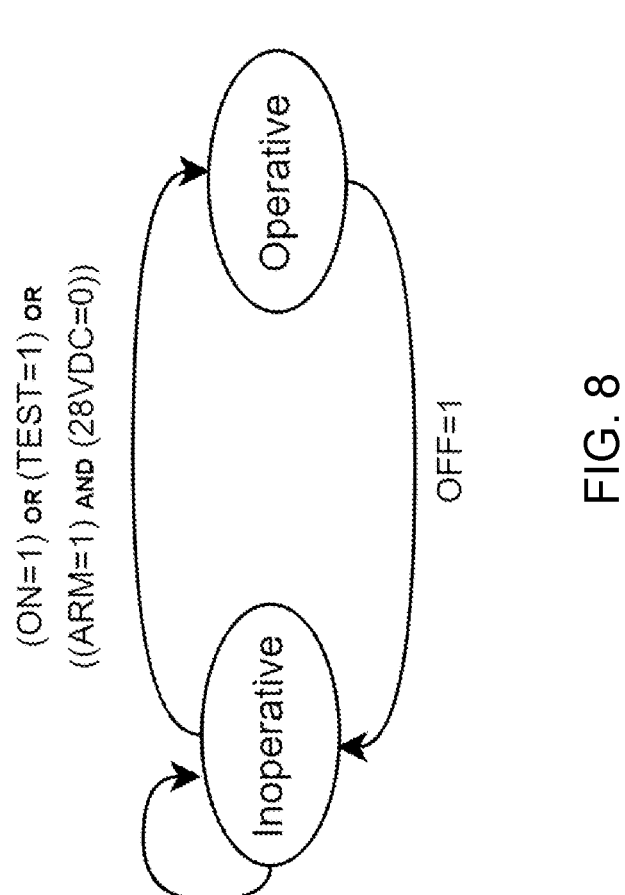
FIG. 8 is an example non-limiting controller state diagram.

The example non-limiting technology herein presented is a cabin and emergency illumination system as well as illuminated signs, developed to have a plurality of independent illumination units, in which every unit has at least a light emitting diode (LED) or LED array, a capacitor and a controller circuit. The LED in one embodiment needs to secure the minimum illumination required for the aircraft cabin and be able to illuminate the cabin for at least 10 minutes, in case of no power supply from the airplane.

An example embodiment consists of a light unit that executes up to three different functions (cabin area illumination, individual/dedicated/decorative illumination and emergency illumination) and an emergency illuminated sign unit, each one with an internal controller and a rechargeable capacitor. An example non-limiting embodiment also provides a cabin light system and an emergency lighting system, where each illumination unit (light source or illuminated sign) is of the type described herein.

In example embodiments, the LED is responsible for emergency and normal operation, there is no disconnection circuit, and the capacitor is connected to the illumination unit. As the power source is DC there is no need to convert the power from AC to DC. The example system herein presented has a control unit for each illumination unit.

FIG. 3 shows an example emergency lighting system in accordance with an example non-limiting embodiment. The cockpit panel is where the pilot controls the state of the system. The illumination unit is responsible for illuminating the cabin according to the state of the system. This system can be (re)located in any aircraft, including but not limited to eVTOLs, VTOLs and rotorcraft. In one embodiment, the state off the Emergency Lighting System is determining automatically, but the individual lighting units, as part of the system, operate together. In one example embodiment, it not possible to activate just one light unit; the command is the same for all lights in the emergency lighting system so all the light units are operative or inoperative at the same time. Other modes of operation are possible however.

FIG. 3 shows, as one example, eleven (11) illumination units 50(1), . . . 50(11). Each illumination unit 50 may be independent and operate independently of the other illumination units so that failure of one or more illumination units does not cause failure of other illumination units. Some illumination units 50 provide passenger light illumination. Other illumination units (5) provide exit sign illumination.

An example embodiment of a non-limiting illumination unit 50 provides the following circuits as shown in FIG. 4:

a protection circuit 100 an Emergency power supply circuit 400 with ultracapacitor 300 a control and test circuit 200 an illumination source composed by at least one LED 500 for a passenger light or an exit sign as one example.

The Protection Circuit 100 is responsible for protecting the input signals and input power against over-voltage, over-current, reverse polarity, etc. In general, every cabin light has a protection circuit.

The ultracapacitor 300 (also known as a supercapacitor) comprises a high capacity capacitor that in one embodiment uses electrostatic double-layer capacitance and electrochemical pseudocapacitance to achieve very high charge storage capacity. See e.g., Bueno, "Nanoscale origins of super-capacitance phenomena". Journal of Power Sources. 414: 420-434. (28 Feb. 2019, doi.org/10.1016/j.jpowsour.2019.01.010; IEC 62391-2; G. L. Bullard et al, "Operating principles of the ultracapacitor," IEEE Transactions on Magnetics, vol. 25, no. 1, pp. 102-106 (January 1989), doi: 10.1109/20.22515; Calle et al, Graphene-Based Ultra-Light Batteries for Aircraft, NASA Aeronautics Mission Directorate 2014 Seedling Technical Seminar, Cocoa Beach, FL (Feb. 19, 2014); Maxwell Technologies, 3.0V 3400F ULTRACAPACITOR CELL DATASHEET BCAP3400 P300 K04/05.

The Emergency Power Supply 400 in one embodiment is an analog circuit responsible for powering the lighting unit 500 in normal operation, charging the ultracapacitor 300 and powering the emergency lighting unit when aircraft power is not available. As shown in FIG. 5, the Emergency Power Supply 400 is composed by the following circuits in one embodiment:

a buck DC-DC converter 402 to convert aircraft DC voltage (e.g., 28 VDC) to capacitor operational voltage (this capacitor operational voltage may depend on the structure of the ultracapacitor including its voltage rating, but in one embodiment is a low voltage such as 3 VDC or 4 VDC or 5 VDC or 6 VDC or 7 VDC or 8 VDC or 9 VDC or 10 VDC or 11 VDC or 12 VDC).

an ultracapacitor 300 to store and provide power to the LEDs 500. A bank of ultracapacitors can be used as power source but in this case a balance charge circuit may be included on the unit to balance charging between the different ultracapacitors in the capacitor bank.

switches 409, 410, 412 (e.g., high current MOSFETs or relays) to control charging and the discharging of the ultracapacitor.

a capacitor voltage monitor 404 to activate the charge switch 409 when the capacitor voltage is below a specified value and to deactivate the charge switch when the capacitor voltage reaches a desired specified value).

a safety heat sensor 408 to monitor the temperature of the ultracapacitor 300.

a failure switch 410 to cut the power supply to the ultracapacitor 300 in case of failure.

a buck-boost DC-DC converter 406 to convert the capacitor output voltage to the LED operational voltage (this may not be required if the capacitor output voltage is the same as the LED operating voltage).

reverse polarity protection (RPP) diodes 702 and 704 to protect the load against reverse polarity damage and allow either the primary aircraft power source or the supercapacitor to power the system.

The RPP block 702 bypasses the emergency power supply 400 and selectively supplies aircraft power to the LED illumination units such as a passenger light, an exit sign or a cabin light. This power can be supplied or not supplied depending on cockpit control and/or on passenger control inputs.

The control and test circuit 200 is responsible to control the operation of emergency lights. The emergency lighting system 50 will have a control on the cockpit 600 (and may have a second control for cabin crew) so the pilot manually changes the system status between ON, OFF and ARMED, and there is a means to safeguard the system regarding inadvertent change of status.

As shown in the FIG. 8 state diagram, the system is operative when the cockpit turns the system ON, independent from availability or unavailability of the aircraft power source. Similarly independent from availability or unavailability of the aircraft power source, the system will be OFF if the cockpit turns the system OFF. The system can be manually switched ON or OFF from the cockpit. When the cockpit switches the system to ARMED, the emergency illumination will remain off so long as the aircraft supplies an available power source. When the system is ARMED and the 28 VDC aircraft power source comes unavailable, the system will become operative. The system automatically detects when the main aircraft supply voltage is no longer producing current while the aircraft is still on/operating, and will illuminate the emergency lights if the system is ARMED. The system is also operative when a momentary-on TEST button is activated.

In the example shown, the control signals from the cockpit 600 are distributed to each emergency lighting unit 50 over one or more control busses, wires, cables, and/or wirelessly.

The illumination source 500 will have up to three different functions: (1) provide individual lighting for one passenger, (2) provide cabin area lighting when all units are commanded on, and (3) provide emergency lighting during emergency conditions where the system is operative. In one embodiment, each passenger seat has a switch that can turn an individual light above or near the passenger seat ON and OFF. The system can also be manually controlled from the cockpit to turn on the emergency lights ON such as during boarding and deplaning.

An example application of the embodiments herein is an eVTOL, VTOL, aircraft or rotorcraft cabin as shown in FIG. 6. In such applications, the emergency light system eliminates the need for and use of dedicated battery packs and consequently reduces system weight. The vehicle harness complexity is also reduced as the light units do not need to receive power from two independent battery packs as in FIG. 1. Maintenance activities are also reduced as the capacitors do not need to be replaced as often as battery packs. All the simplification obtained by the example embodiments herein leads the development and certification of new vehicles to be faster and cheaper (reduction on engineering hours spend on system analysis).

The technology herein described mainly have advantages on technical and economical fields but it also have an other important positive impact. The environment is beneficiated due the reduction in batteries discharge.

All patents and publications cited herein are incorporated by reference as if expressly set forth.

The invention claimed is:

1. An aircraft lighting system with integrated cabin lighting and emergency lighting functions configured for use on board an aircraft, the aircraft lighting system comprising plural independent illuminators configured to be used in combination and distributed within an aircraft cabin, wherein each of the plural independent illuminators comprises:

at least one aircraft light source;

an ultracapacitor configured to store energy;

a controller configured to selectively connect the ultracapacitor to the at least one aircraft light source and to control activation mode of the at least one aircraft light source; and an ultracapacitor health monitoring circuit that includes monitoring of component charge and temperature of the ultracapacitor;

wherein failure of any one of said plural independent illuminators does not affect operation of any other ones of the plural independent illuminators.

2. The aircraft lighting system of claim 1 wherein each illuminator further includes a converter that converts a power supply output to a charging voltage for the ultracapacitor.

3. The aircraft lighting system of claim 1 wherein the ultracapacitor health monitoring circuit includes a charge monitor operatively coupled to the ultracapacitor, the charge monitor selectively controlling charging of the ultracapacitor based on a voltage of the ultracapacitor.

4. The aircraft lighting system of claim 1 wherein the aircraft light source comprises at least one light emitting diode or an electric active exit sign.

5. The aircraft lighting system of claim 1 wherein each illuminator further comprises a converter that converts a voltage output of the ultracapacitor to an operating voltage of the at least one aircraft light source.

6. The aircraft lighting system of claim 1 wherein the aircraft comprises a rotorcraft, an eVTOL or a VTOL.

7. The aircraft lighting system of claim 1 wherein the plural independent illuminators are configured to provide individual lighting for corresponding passengers, provide cabin area lighting when all of the plural independent illuminators are commanded on, and provide emergency lighting during emergency conditions where normal aircraft power for cabin illumination is inoperative.

8. The aircraft lighting system of claim 1 wherein the ultracapacitor health monitoring circuit comprises a temperature sensor that monitors temperature of the ultracapacitor and disables charging of the ultracapacitor when the monitored temperature exceeds a predetermined limit.

9. The aircraft lighting system of claim 1 wherein no battery external to said illuminators is required to operate said illuminators.

10. The aircraft lighting system of claim 1 wherein each illuminator is configured to provide the following lighting functions: e cabin area illumination, individual/dedicated illumination, and emergency illumination.

11. The aircraft lighting system of claim 1, further comprising:

a cockpit control panel with three states (ON, OFF, ARM) for manually controlling the emergency lighting function; and an automatic activation controller configured to activate the emergency lighting function upon detection of a loss of primary aircraft power when the system is in an armed state.

12. The aircraft lighting system of claim 1, wherein the ultracapacitor health monitoring circuit is configured to assess charging status and temperature of the ultracapacitor, and is further configured to provide a status indication reflecting a health condition of the ultracapacitor based on assessed charging status and temperature of the ultracapacitor.

13. The aircraft lighting system of claim 1, wherein the controller is configured to manage charging and discharging of the ultracapacitor to optimize lifespan of the ultracapacitor.

* * * * *